A. C. BEECH.
TRACTION DEVICE.
APPLICATION FILED JAN. 31, 1921.

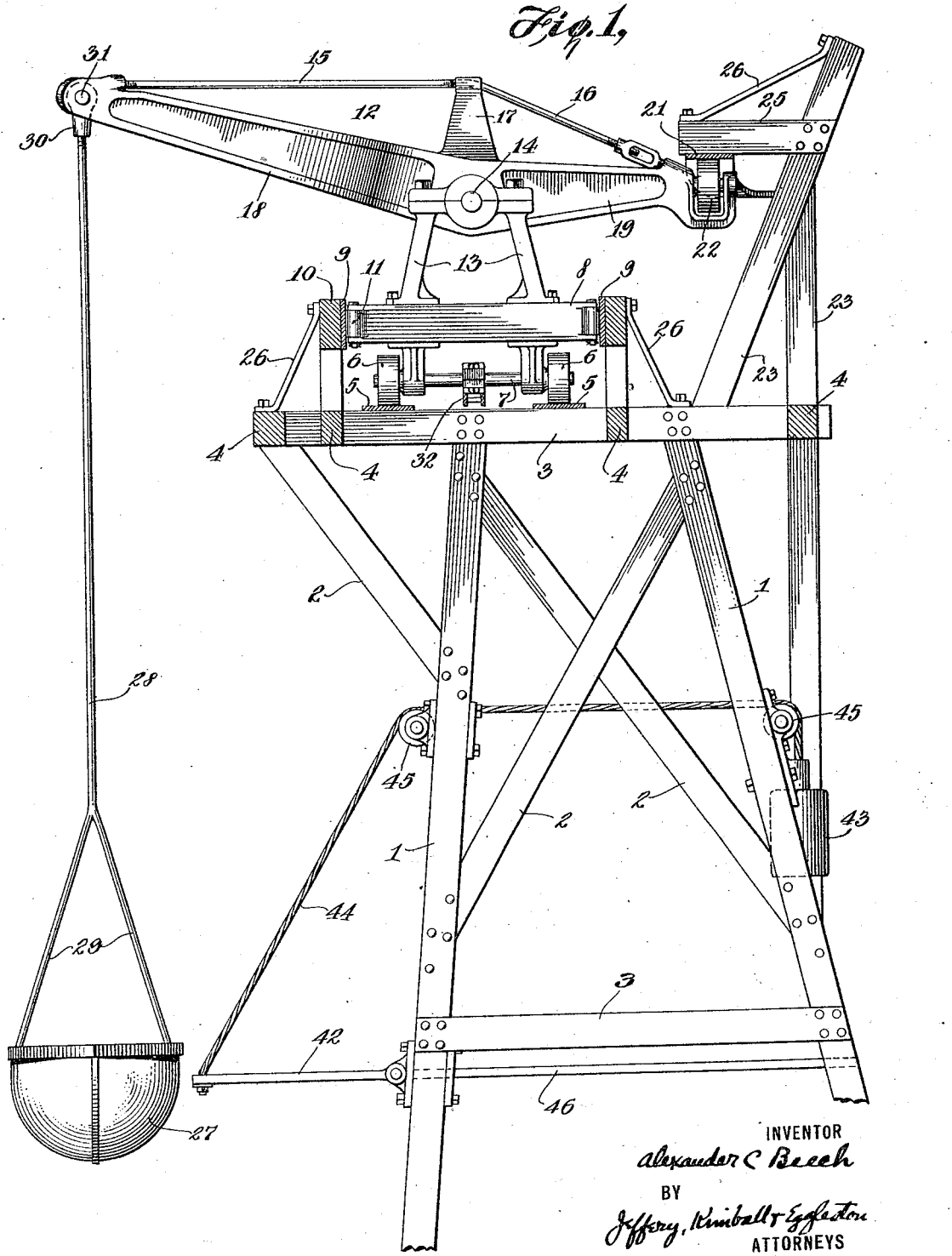

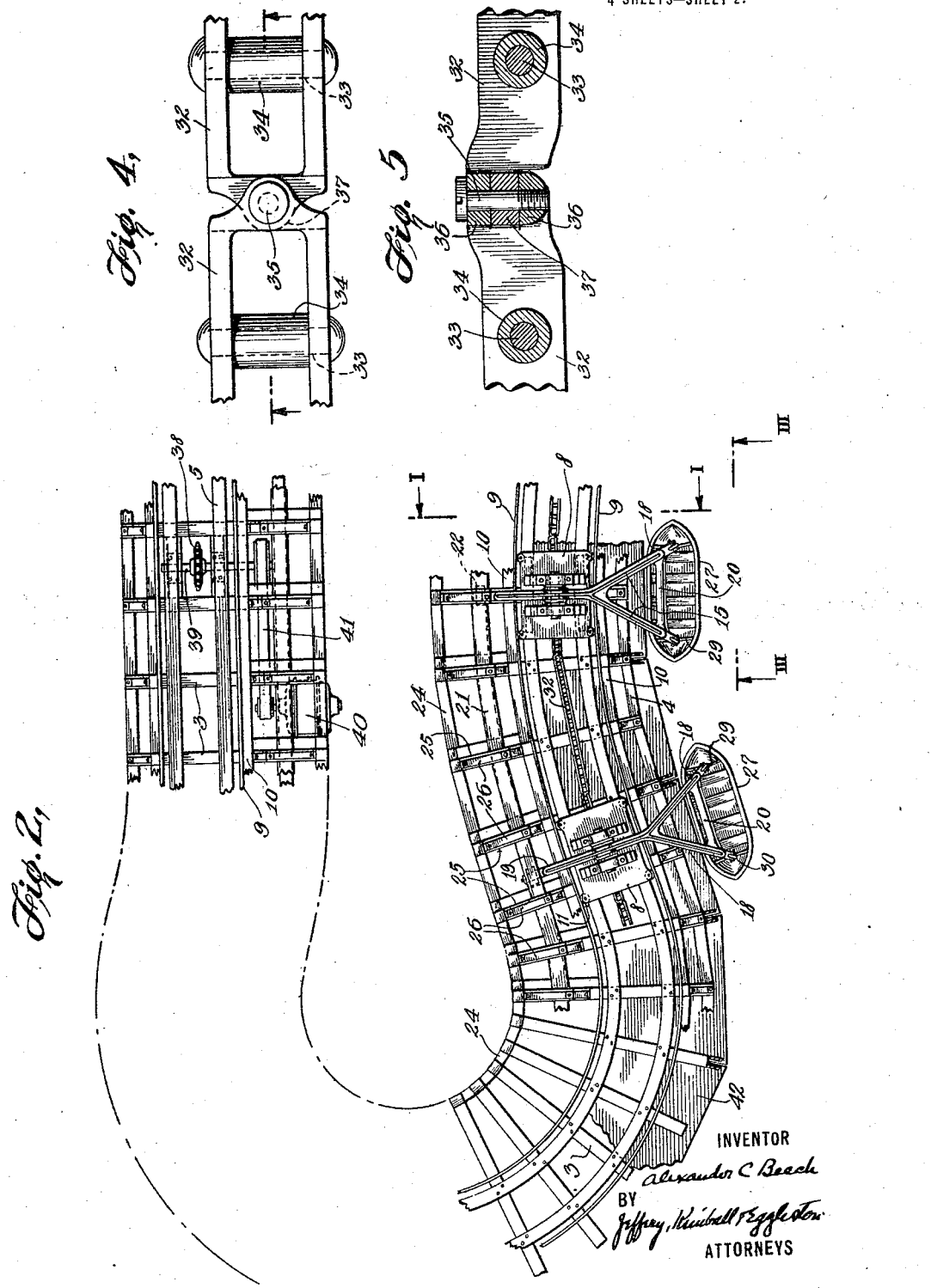

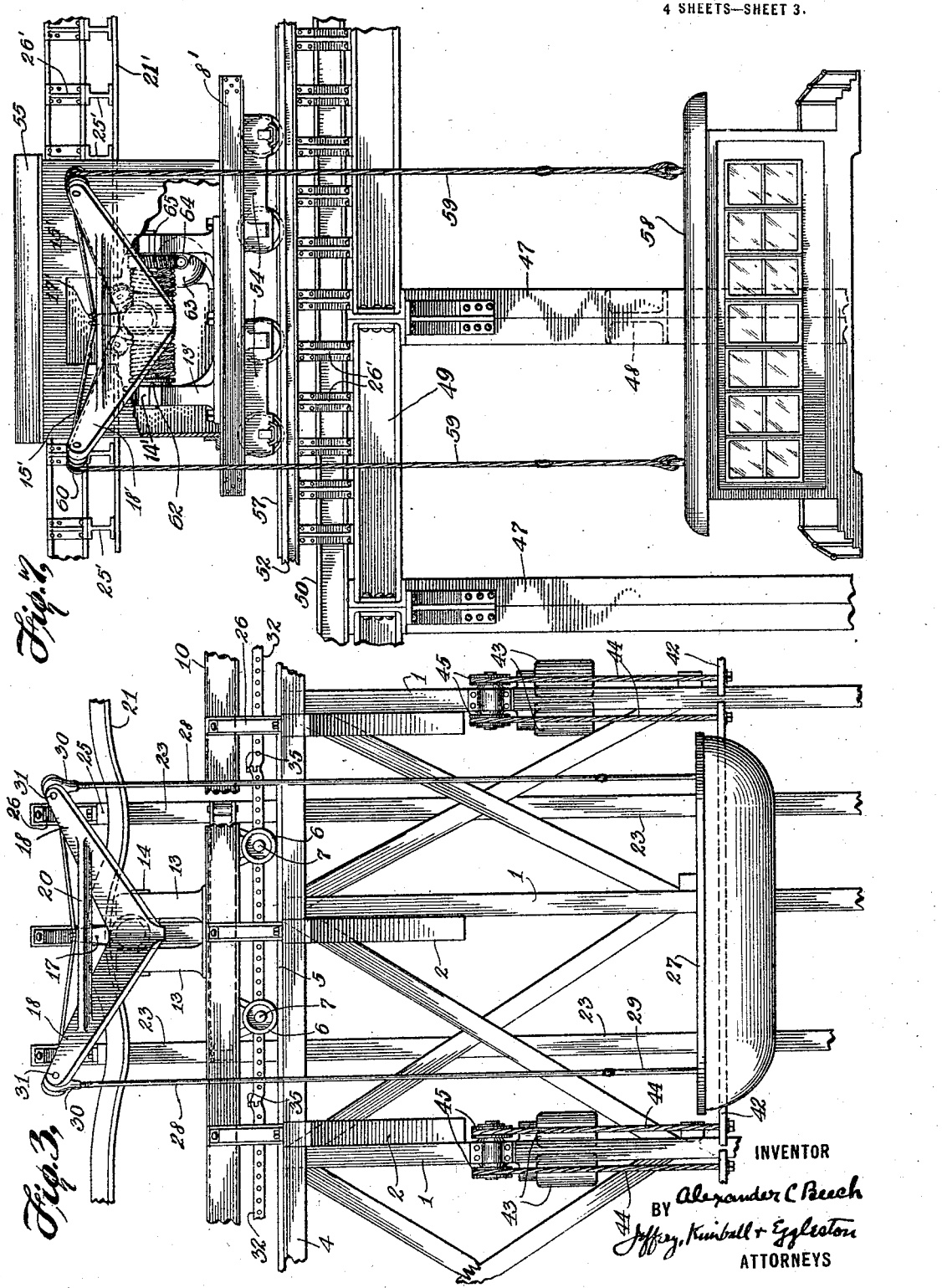

1,413,891.

Patented Apr. 25, 1922.
4 SHEETS—SHEET 4.

INVENTOR
Alexander C. Beech
BY
Jeffery, Kimball & Eggleston
ATTORNEYS

UNITED STATES PATENT OFFICE.

ALEXANDER C. BEECH, OF WEST PULLMAN, ILLINOIS, ASSIGNOR TO HAROLD PICKARD, OF ALLENDALE, NORTHUMBERLAND, ENGLAND.

TRACTION DEVICE.

1,413,891. Specification of Letters Patent. Patented Apr. 25, 1922.

Application filed January 31, 1921. Serial No. 441,278.

*To all whom it may concern:*

Be it known that I, ALEXANDER C. BEECH, a British subject, residing in West Pullman, county of Cook, and State of Illinois, have invented the following described Improvements in Traction Devices.

My invention relates to traction devices primarily for amusement purposes, but applicable also to elevated railways handling regular passenger traffic. It has to do with novel means for supporting the passenger car so that it has a compound movement which, when the invention is embodied in amusement apparatus, may be widely varied, and which consists of the travel of a supporting carriage with reference to which the passenger car is movably mounted, and another movement or movements which may be imparted to the passenger car as the supporting carriage travels, and preferably by virtue of such travel. The carriage may be propelled in any manner or operate by gravity on a track of any desired contour in plan and in elevation. On this carriage is movably mounted a supporting structure which I have shown as a pivoted beam or lever from one arm of which the car is suspended preferably at one side of and below the track. One of the arms of the lever carries a contact member making traveling contact with a continuous stationary rail which follows substantially the direction of the track and may have the same contour as the track, or a different contour. It will be apparent that in either case the passenger car will at all times be supported at the desired level and that where the contours of the track and rail are not the same movement additional to the travel of the carriage is imposed on the passenger car as the carriage travels, such movement being given to the supporting structure and so to the car, which being preferably suspended can also swing transversely when the track is curved, it being possible to imitate various aeroplane movements by suitably combining the several movements referred to.

It will be understood that when the invention is applied to an elevated railroad for handling ordinary passenger traffic the contour of the track and rail will be the same. In amusement apparatus it is usually undulating.

Referring to the drawings—

Figure 1 is a transverse vertical section through amusement apparatus embodying my invention;

Figure 2 is an incomplete plan of an amusement railway embodying my invention, and shows a plurality of carriages and passenger cars, the track supporting structure, and usual driving means;

Figure 3 is a side elevation corresponding to Figure 1, but on a scale different from that of Fig. 1 and from that of Fig. 2 on which the line III—III further indicates the nature of Fig. 3.

Figure 4 is a detail plan showing the mode of connecting adjacent rack sections;

Figure 5 is a vertical section corresponding to Fig. 4;

Figure 7 is a side elevation corresponding to Figure 6.

Figure 6:
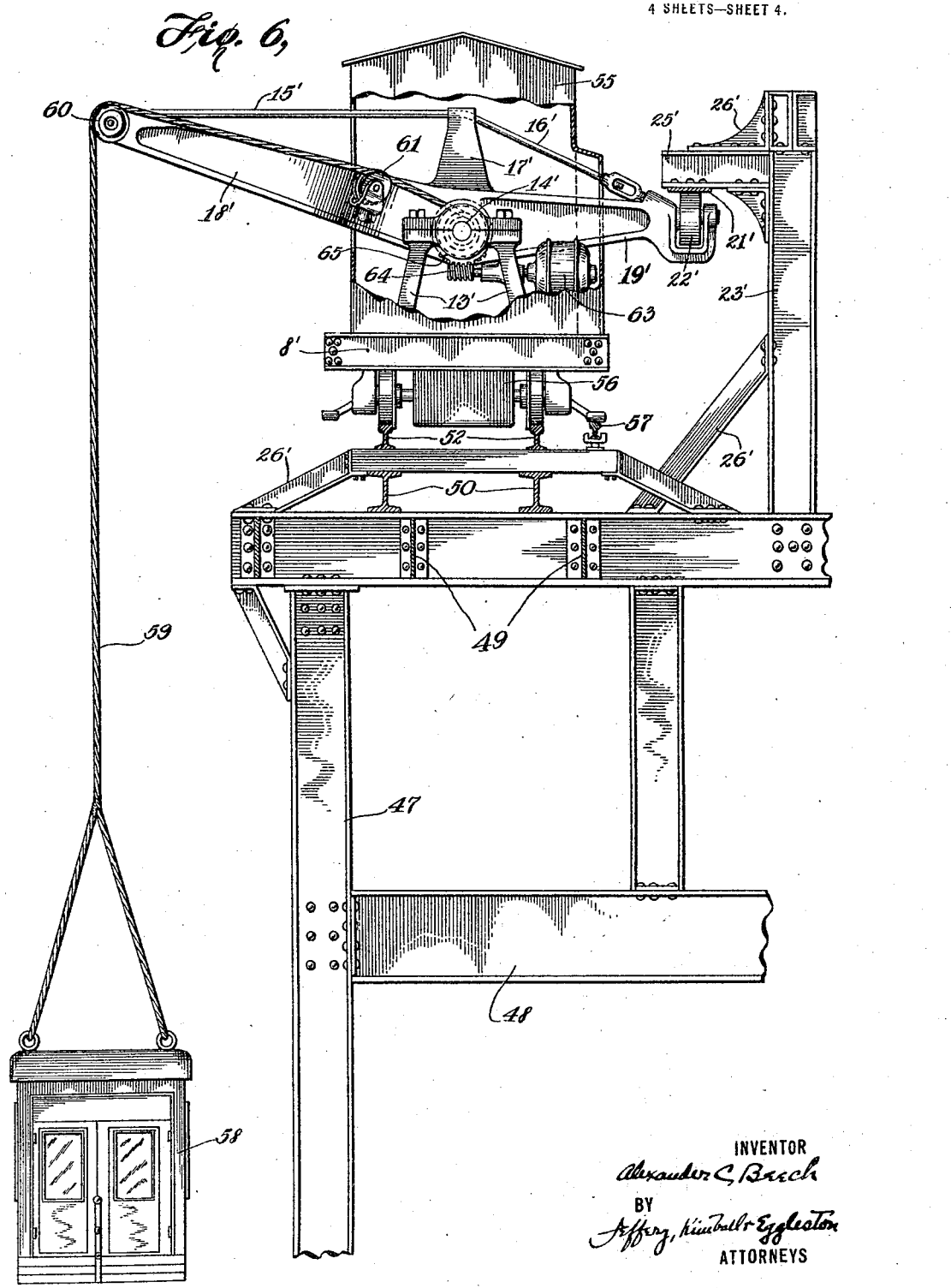
Figure 6 is a vertical section showing my invention applied to an elevated railroad.

Referring to Figures 1 to 5, which relate to the embodiment of my invention in amusement apparatus, I prefer to employ an elevated structure on the order of that usual in switchbacks with uprights 1, braces 2, cross-beams 3, and longitudinal beams or stringers 4, the precise construction not being important. It will be understood that although I prefer to elevate the track this need not invariably be done. This structure or trestle supports the track 5, on which in the construction illustrated run the wheels 6 carried by the axles 7 of the carriage 8, which may be kept in place by guide rails 9 secured to longitudinal beams 10 on each side of the track and with which anti-friction rollers 11 mounted on the carriage coact. It will be understood that these guide rails follow the contour of the track both in plan and in elevation. While I have shown a track having two parallel rails and a carriage having four wheels, I may of course employ a track of any type as a single rail and one or more wheels up to any desired number for co-action therewith or with ordinary parallel tracks, obviously also guide rails need not always be used. The carriage, which may be operated by gravity, or which may be power driven in any desired way, is provided with supporting structure movably mounted thereon and which is illustrated as a beam or beams 12 pivotally mounted on the frames 13 which are firmly secured to the carriage and are provided with removable caps 14. These beams may be constructed as shown with tension members 15 and 16 extending from an intermediate projecting portion 17 to the ends of the respective arms 18 (which may be bifurcated as shown in Figures 2, 3) and 19. The cross-piece 20 may connect the arms 18 to brace the same. A continuous rail 21 follows substantially the direction of the track, and serves to determine the position of the supporting structure 12, whose arm 19 is provided with a contact member, suitably an anti-friction roller 22, which runs along the rail preserving traveling contact therewith as the carriage travels. This rail I have illustrated as inverted, the contact of the roller being with its under side, and this is the construction which I shall expect to employ in practice although other arrangements of the rail are possible though inferior.

While in amusement apparatus I prefer to make the rail 21 of substantially the same contour in plan as the track 5 but of different contour in elevation to give the car up and down movement, I might, with some of the good effects sought, make the respective contours substantially the same in elevation but different in plan, the movably mounted supporting structure being suitably arranged to be operated by such difference. Furthermore, I do not mean to exclude locating the axis of the rail in a plane oblique to the horizontal and normal to the face of the rail, thereby giving the car back and forth movement in a direction oblique to the horizontal, the movement in all these cases being at an angle to the plane of the track, but in any case in which motion is to be imposed on the travel of the carriage the rail and track contours are not the same.

The rail 21 may be mounted on the trestle in any ordinary way as by uprights 23, longitudinal beams 24, and cross-pieces 25. Braces 26 are applied between the adjacent sides of uprights 23 and cross-pieces 25, and similar braces may be employed elsewhere in the structure as indicated. The supporting structure 12 carries by means of the arm or arms 18 the passenger car 27, which in Figures 1 to 3 takes a form which is suitable to an amusement apparatus, and which may be relatively light as indeed are the other parts of the structure when designed for purposes of amusement. This car is preferably suspended from the arm or arms 18 as by rods 28 having forked ends 29 secured to the car adjacent its ends. Cables may be used instead of rods, the requisites being that the car be supported so as not to tip sidewise unduly, but to be free to swing transversely about the points of suspension, which as illustrated in Figures 1 and 3 are formed by eyes 30 to which the rods 28 are secured, and through which the pins 31 pass. Given a straight track suspension is not necessary, a rigid mounting being possible. It will be apparent that the level of the car is at all times determined by the rail, which takes the upward thrust due to the weight of the car and passengers and transmitted by the supporting structure, and thus assists the carriage in supporting the load. In order to vary the position of the car as the carriage travels, and by virtue of such travel, it is only necessary as above explained to give the track and rail different contours, which may be done without risk having due regard to the limits of safety and in such a way as to produce exhilarating compound movements of the car to the entertainment of the passengers. Although the carriages need not have any motive means and indeed need not be power driven at all since they may operate by gravity, I have illustrated in Figs. 1 to 5 conventional and usual means for operating them in a continuous series, these means involving rack sections 32 provided with pins 33 and sleeves 34 and secured to any stationary part of the carriage, as to the axles 7. Adjacent rack sections are pivoted together at their ends by vertical pins 35 passing through a pair of lugs 36 on one of said sections, and an intermediate lug 37 on the other, the construction at this point being clearly indicated in Fig. 5. The continuous rack or chain thus formed is driven by the sprocket 38 on shaft 39, which is located on a straight portion of the track so as to co-act with said rack, the shaft 39 being driven in any suitable way as by the motor 40 through pulleys and belt 41, or otherwise. Pivoted landing platforms 42, provided with counterweights 43 secured to the platform ends by cables 44 running over pulleys 45 may be employed, said platforms being adjacent stationary landing stages 46.

My traction devices may be used for the conveyance of passengers, particularly in congested areas where there is not room for the usual elevated structure. In such localities the track may be erected entirely to one side of the street on the tops of the buildings for example, and by providing means for lowering the suspended cars to the street or other suitable landing level the passengers may be taken on and discharged and the car then raised so as to be clear of other traffic. Figures 6 and 7 illustrate an elevated railroad embodying my invention and show the heavier supporting structure which will be used in such a case and which may comprise columns or posts 47, cross girders 48, longitudinal girders 49, and special track I beams 50. Heavy rails 52 constitute the track on which the trucks 54 of the carriage 8′ having the housing structure 55 run, said carriage being in general similar to the carriage 8, but more strongly built and driven by motors 56 supplied by third rail 57. Except in the matter of strength the lever construction and supporting means may be the same as that described in connection with Figures 1 to 3, and corresponding parts have been given the same reference numerals primed. The construction is however different from that previously described in that the cars are regular passenger cars 58, except that wheels, etc., are omitted, and are suspended by cables 59 running over pulleys 60, 61, to a drum 62 which may be driven by a motor 63 on the car through worm gearing 64, 65, this arrangement being utilized for lowering the passenger cars to take on and discharge passengers, and for raising the car again to the level at which it is normally carried. The inverted rail 21' in this construction is more strongly supported so as to sustain the increased thrust and as already stated its contour is the same both in elevation and plan as that of the track. It is obviously possible and may be desirable where the car is very heavy to make the movable supporting structure in two or more distinct parts each with its own contact member and constructed in the same way as the supporting levers shown in the drawings, except that the car carrying arms need not be bifurcated since each such lever may carry only a single cable. It will be understood that the undulations in the rail 21' should not be abrupt but gradual especially where the supporting structure consists of two levers each with its contact member as just explained.

The motion superimposed upon the passenger car is preferably non-compensating, at least in amusement apparatus, that is, it is a motion apparent to those in the car creating rather than eliminating deviations of car movement from parallelism with the track contour.

Claims—

1. Traction devices comprising in combination a gravity or power driven carriage, a track on which said carriage travels, a beam pivotally mounted on said carriage, a passenger car supported by one end of said beam; and an inverted rail adapted to hold the other end of said beam at any required level.

2. Traction devices comprising in combination a gravity or power driven carriage, a track on which said carriage travels, an inverted rail following substantially the direction of the track, a beam pivotally mounted on said carriage, and a passenger car suspended from one end of said beam, the other end thereof having travelling contact with the under side of said inverted rail, and being held by said rail at all times at any required level.

3. Traction devices comprising in combination, a carriage, a track on which said carriage travels, a lever pivotally mounted between its ends on said carriage, a passenger car suspended from said lever at one side of its fulcrum, the lever having a contact member at the other side of its fulcrum, and an inverted rail following substantially the direction of the track and taking the upward thrust of the car transmitted through the lever and contact member.

4. Traction devices comprising in combination, a carriage, a track on which said carriage travels, a lever pivotally mounted on said carriage, a passenger car suspended from an arm of said lever, and a rail following substantially the direction of the track and assisting the carriage in supporting the car by a contact maintained with said lever as the carriage travels.

5. Traction devices comprising in combination, a carriage, a track on which said carriage travels, a lever extending transversely of said carriage and pivotally mounted thereon, a passenger car suspended from an arm of said lever at one side of said carriage and a continuous stationary rail assisting the carriage in supporting the car by a contact maintained with said lever as the carriage travels.

6. Traction devices comprising in combination, a carriage, a track on which said carriage travels, supporting structure movably mounted on said carriage, a passenger car suspended from said supporting structure at one side of said carriage, and a stationary rail with which said supporting structure maintains contact as the carriage travels, the respective contours in elevation of said rail and track differing so as to give said supporting structure up and down movement.

7. Traction devices comprising in combination, a carriage, an elevated track upon which said carriage travels, supporting structure movably mounted on said carriage, a passenger car suspended from said structure at one side of said carriage, said supporting structure having a contact member, and an undulating rail following substantially the direction of the track and co-operating with the said contact member to take the thrust of the car and to give the structure, and through it the car, back and forth motion as the carriage travels.

8. Traction devices comprising in combination, a carriage, an elevated track on which said carriage travels, a lever mounted on said carriage and having arms projecting respectively at opposite sides of said carriage, a passenger car suspended from a lever arm which projects beyond one side of the carriage, a contact member carried by a lever arm which projects beyond the other side of the carriage, and a stationary cam rail following substantially the direction of the track and co-operating with the said contact member to take the thrust of the car and to impose on the lever and through it on the car controlled varying movement additional to the travel of the moving carriage.

9. Traction devices comprising in combination, a carriage, a track upon which said carriage travels, supporting structure movably mounted on said carriage, a passenger car supported by said structure, and a rail whose contour differs from that of the track but which follows substantially the direction of the track, said supporting structure having travelling contact with said rail to take the thrust of the car and to determine the position of the supporting structure and through it of the car.

10. Traction devices comprising in combination, a carriage, a track upon which said carriage travels, supporting structure movably mounted on said carriage, a passenger car suspended from said structure at one side of said carriage, and a rail which has a contour in elevation differing from that of the track, but which follows substantially the direction of the track and co-operates with the said supporting structure to take the thrust of the car and to give the supporting structure and through it the car up and down motion as the carriage travels.

11. Traction devices comprising in combination, a carriage, a track upon which said carriage travels, supporting structure movably mounted on said carriage, a passenger car suspended from said supporting structure, said supporting structure having contact means, and an undulating rail following substantially the direction of the track and co-operating through the contact means with said supporting structure to assist in supporting the car and to give the supporting structure, and through it the car back and forth motion as the car travels.

12. Traction devices comprising in combination, a carriage, a track on which said carriage travels, supporting structure movably mounted on said carriage, a passenger car supported by said structure, an inverted rail following substantially the direction of the track and a contact member with which the support is provided and which has traveling contact with the under side of said rail as the carriage travels.

13. Traction devices comprising in combinaton, a track on which said carriage travels, supporting structure pivotally mounted on said carriage, a passenger car supported by said structure, and a rail following substantially the direction of the track and having a different contour from that of the track, said supporting structure having a part in traveling contact with said rail as the carriage travels, whereby the pivotally mounted supporting structure is oscillated.

14. Traction devices comprising in combination, a carriage, a track on which said carriage travels, supporting structure movably mounted on said carriage, a passenger car suspended from said supporting structure, and means brought into operation by the travel of the carriage for giving to the supporting structure, and through it the car, controlled non-compensating movement distinct from the travel of the carriage.

15. Traction devices comprising in combination, a carriage, an elevated track on which said carriage travels, a passenger car suspended from said carriage and means for giving the car controlled non-compensating movement with reference to the carriage as the carriage travels along the rails by virtue of such travel.

16. Traction devices comprising in combination, a carriage, an elevated track on which said carriage travels, a passenger car movably mounted on said carriage and suspended therefrom at one side thereof, and means for giving said car controlled up and down movement additional to and imposed upon the travel of the carriage by virtue thereof.

17. Traction devices comprising in combination, a carriage, a track on which said carriage travels, supporting structure movably mounted on said carriage, a passenger car suspended from said supporting structure, and devices for giving the supporting structure up and down movement as the carriage travels and by virtue of its travel.

18. Traction devices comprising in combination, a carriage, a track on which said carriage travels, an inverted rail following substantially the direction of the track, a beam pivotally mounted on said carriage, a passenger car suspended from one end of said beam, the other end of said beam having traveling contact with the under side of said inverted rail and being held by said rail at all times at any required level, and hoisting apparatus on said carriage connected to said car for raising and lowering the same, whereby passengers may be received or discharged without the provision of elevated stations.

In testimony whereof, I have signed this specification.

ALEXANDER C. BEECH.